(12) United States Patent
Speak et al.

(10) Patent No.: US 11,933,065 B2
(45) Date of Patent: Mar. 19, 2024

(54) WEIGHTED SKIMMER BASKET HANDLE WITH NOVEL LOCKING MECHANISM

(71) Applicants: Brent Speak, Alpharetta, GA (US); Monica Speak, Alpharetta, GA (US)

(72) Inventors: Brent Speak, Alpharetta, GA (US); Monica Speak, Alpharetta, GA (US)

(*) Notice: Subject to any disclaimer, the term of this patent is extended or adjusted under 35 U.S.C. 154(b) by 19 days.

(21) Appl. No.: 17/970,709

(22) Filed: Oct. 21, 2022

(65) Prior Publication Data
US 2023/0051140 A1 Feb. 16, 2023

Related U.S. Application Data

(63) Continuation-in-part of application No. 17/147,761, filed on Jan. 13, 2021, now Pat. No. 11,655,647.

(51) Int. Cl.
E04H 4/14 (2006.01)
E04H 4/12 (2006.01)
B01D 29/27 (2006.01)

(52) U.S. Cl.
CPC .............. *E04H 4/1272* (2013.01); *E04H 4/14* (2013.01); *B01D 29/27* (2013.01)

(58) Field of Classification Search
CPC .......... B25B 13/48; B25B 13/481; B25J 1/04; E04H 4/14; E04H 4/1272; B01D 29/27
See application file for complete search history.

(56) References Cited

U.S. PATENT DOCUMENTS

| | | | | |
|---|---|---|---|---|
| 6,176,157 B1* | 1/2001 | Ure | ............... | B25B 13/48 |
| | | | | 81/176.1 |
| 6,422,623 B1* | 7/2002 | Thomas | ............... | B66F 19/005 |
| | | | | 294/24 |
| 6,592,756 B1* | 7/2003 | Felix, Jr. | ............... | E04H 4/14 |
| | | | | 210/477 |
| 8,168,065 B1* | 5/2012 | Gavigan | ............... | C02F 1/76 |
| | | | | 210/167.11 |
| 8,636,899 B2* | 1/2014 | Tesauro | ............... | E04H 4/14 |
| | | | | 4/290 |
| 8,864,986 B1* | 10/2014 | Smith | ............... | E04H 4/1272 |
| | | | | 210/232 |
| 2009/0243318 A1* | 10/2009 | Pratt | ............... | B65G 7/12 |
| | | | | 294/209 |
| 2011/0056940 A1* | 3/2011 | Goffman | ............... | E04H 4/1272 |
| | | | | 220/212.5 |
| 2018/0250806 A1* | 9/2018 | Gladue | ............... | B25G 1/10 |
| 2019/0032352 A1* | 1/2019 | Gladue | ............... | E04H 4/14 |
| 2022/0119291 A1* | 4/2022 | Murphy | ............... | C02F 1/76 |
| 2022/0126483 A1* | 4/2022 | Freeman | ............... | B29C 33/0033 |

* cited by examiner

*Primary Examiner* — Joshua T Kennedy
(74) *Attorney, Agent, or Firm* — Brent Speak; Monica Speak

(57) ABSTRACT

A skimmer basket with weighted handle having a novel locking mechanism is disclosed. The body of the skimmer basket may comprise a plurality of openings. The apparatus may comprise a cylindrically shaped weighted handle having a top side and a bottom side wherein the top side is fixed with a handle. Further, a base cap may be fixed to the bottom side of the weighted handle, wherein the bottom side of the base cap has a rectangular notch. Furthermore, the apparatus comprises a base adaptor having a top side and a bottom side, wherein the top side of the base adaptor comprises of a T-shaped bar that locks into the rectangular notch provided on the bottom side of the base cap, and wherein the bottom side of the base cap is fastened to the base portion of the skimmer basket using one or more fasteners.

5 Claims, 14 Drawing Sheets

WEIGHTED SKIMMER BASKET HANDLE WITH NOVEL LOCKING MECHANISM

CROSS-REFERENCE TO RELATED APPLICATION

This application is a continuation in-part application of U.S. Non-Provisional patent application Ser. No. 17/147,761 entitled "REMOVABLE SKIMMER BASKET HANDLE" filed Jan. 13, 2021.

TECHNICAL FIELD

The present invention relates to the field of liquid separators in closed water circulating systems. More particularly, the present invention related to the field of skimmers used in swimming pools.

BACKGROUND

Water stored in swimming pools and related structures are generally re-circulated for the purpose of separating solid debris from the water and/or for the purpose of purification of water. A swimming pool typically has a plurality of moving parts and equipment working together to achieve this purpose. Pool skimmers may be found in almost all modern swimming pools. The rectangular openings located on the side of an in-ground pool are referred to as built-in skimmers. Depending on the size of the pool, more than one skimmers may be installed. Pool skimmers are configured to draw water from the surface of the pool and route it through the pool's filtration system. Water drawn into the skimmer may help remove the contaminants and debris such as chemicals (sunscreen, oils, etc.), hair and leaves from the pool before they sink to the bottom.

Without a working skimmer, debris and chemicals may not be removed property from the pool. The pumps installed in the pool may also be damaged without a properly functioning skimmer. One of the important components of the skimmer includes the skimmer basket. The skimmer or strainer basket collects the debris before it is pulled into the pump. This is an essential component of the skimmer as without the basket, debris will clog and damage the pool's filtration system. Skimmers should always have a leaf basket or filter between it and the pump to avoid blockages in the pipes leading to the pump and filter.

Skimmers hold baskets, which performs a similar function to the handheld leaf skimmer, keeping leaves, twigs, and other debris from making their way into the pool filtration system. Conventional pool skimmer baskets are small and sit at the bottom of the skimmer body unit. The size of a conventional skimmer basket limits the amount of material it can hold. If the skimmer basket is not heavy enough there can also be issues of the skimmer basket floating to the surface of the water and losing its effectiveness all together. Conventional skimmer baskets also have the issue of deterring air flow if the basket and/or skimmer body becomes clogged with debris. Without adequate air flow the pool filtration system and motor can become damaged. The place where the skimmer basket seats at the bottom of the skimmer body means the debris floats above the basket and thus may not be captured by the basket.

Further, an individual attempting to empty a current skimmer basket must reach through the water and floating debris to grab hold of the basket handle and lift it towards the surface. While lifting the skimmer basket for emptying, the floating debris is dispersed back into the water within the skimmer body and many times back into the pool. When emptying the skimmer basket the individual must reach through the debris and many times scoop the captured debris out of the skimmer basket manually. This debris can include leaves and other natural waste as well as both living and dead bugs and small animals. When returning a current skimmer basket to the skimmer body the individual is required to manually return the basket back through the water and remaining debris to properly seat the basket. Many times, the remaining debris is caught underneath the skimmer basket and ultimately gets sucked further into the system causing clogs and damage to more expensive components of the pools filtration system.

There are multiple solutions that have been presented in prior art. For instance, For example, U.S. Pat. No. 8,202,416 teaches a diverter plate that replaces the existing weir 170 and consists of two parts that move into the skimmer 100. Although the diverter plate of the '416 patent claims to increase suction power, it does nothing to address the lack of capacity of the skimmer basket 160, the fact that a pool owner has to dip his or her hands into dirty water to remove the skimmer basket 160, or breakage of basket handles 166.

U.S. Pat. No. 5,830,350 teaches a vented tower that extends from the floor 161 of the skimmer basket 160 and seeks to address a particular problem associated with the skimmer basket 160, namely, the basket 160 being sucked to the skimmer well 198 by the pump 190. The '350 patent does nothing to address the small capacity of the skimmer basket 160, as the vents in the tower are air vents. The '350 patent also does not address the flow rate of water into the basket 160.

Skimmer baskets with floating weirs have also been developed, as described in for example U.S. Pat. Nos. 6,716,342 and 4,325,150. These baskets are designed to prevent water from flowing back into the pool 110 from the skimmer 100 and are not designed to increase basket 160 capacity, make the basket 160 easier to grab, or to increase the velocity of water and debris entering the basket 160.

U.S. Pat. No. 4,737,279 ("the '279 patent") teaches an apparatus that sits on top of a skimmer basket and has two flow paths, one via a coupling for a suction hose and the other via a weir-gated enclosure carried by the basket closure. The '279 patent does not teach or suggest a system that has an inner and outer tube that are attached to a skimmer basket. The '279 patent also teaches that the proper position of the apparatus is the position in which the open weir gated side of the enclosure faces.

While the prior arts described above solve one or more problems related to skimmer assemblies, none of them solve the problem of easy removal of debris from skimmer baskets. It would be desirable to have a solution that allows users to conveniently clear debris from skimmer baskets. The present disclosure proposes a novel solution to easily manage skimmer baskets by means of a skimmer basket with easily removable weighted handle.

SUMMARY

In light of the disadvantages mentioned in the previous section, the following summary is provided to facilitate an understanding of some of the innovative features unique to the present invention and is not intended to be a full description. A full appreciation of the various aspects of the invention can be gained by taking the entire specification and drawings as a whole.

Embodiments of the present disclosure proposes a skimmer basket assembly comprising a weighted handle fastened to said skimmer basket. The weighted handle may be fastened to the bottom side of the basket via an adapter that is fastened to the bottom side of the skimmer basket. A skimmer socks may optionally be used for easily separating and removing debris from the basket. The weighted handle may be fastened/unfastened from the basket using a novel locking mechanism.

The primary desirable object of the present invention is to provide a novel and improved form of a skimmer basket with removable handle. It is another objective of the invention to provide a handle capable of being attached to a skimmer basket where the handle has a column that positions a grip of the handle above the top of the skimmer basket and above the top of the water level when the handle is attached to the skimmer basket. Another object of the present invention is to provide an improved skimmer basket handle capable of being attached to a skimmer well basket, wherein the improved skimmer basket handle has an extended column to permit a cleaning person to have easy access to the portion of the handle to be gripped when the skimmer basket is removed from a skimmer well. It is further object of the present invention is to provide an assembly which is easy to use, hold and clean. It is also the objective of the invention to provide a smart assembly which provide ease of use and convenience to the user and provides multiple functionalities to the user. It is also the objective of the invention to provide an efficient and easy assembly which is cost effective and convenient. It is furthermore the objective of the invention to provide assembly which can be carved including but not limited to plastic, but can be made from metals or similar material by way of carving, machine cutting, injection and moulding. Thus, it is the objective to provide an advancement in removable skimmer basket handle assembly.

This summary is provided merely for purposes of summarizing some example embodiments, to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following detailed description and figures.

The abovementioned embodiments and further variations of the proposed invention are discussed further in the detailed description.

Figure 1:
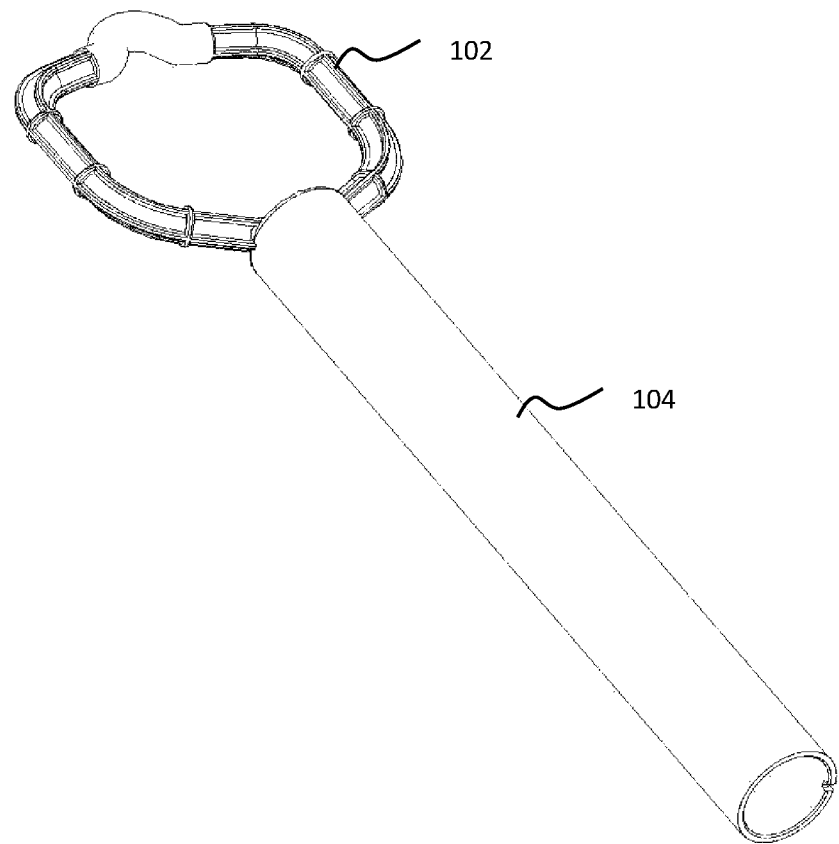
FIGS. 1-3 are perspective views of the weighted handle disclosed herein disclosure according to the embodiments of the present disclosure.

The drawings described herein are for illustration purposes only and are not intended to limit the scope of the present subject matter in any way.

DETAILED DESCRIPTION

In the following description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments maybe utilized and that changes may be made without departing from the scope of the present invention. The following detailed description is, therefore, not to be taken in a limited sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. A single feature of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to the embodiments of the present disclosure, a skimmer basket assembly comprising a weighted handle fastened to said skimmer basket is disclosed. The apparatus described herein provides a weighted handle that allows the skimmer basket to completely sink into the waterbody thereby avoiding floating or misplacement of the skimmer basket from its intended position. The handle may have a cylindrical shape and have a reasonable amount of weight thereby allowing the handle and any attachments to sink properly into the waterbody and stay at it is. The weighted handle may be fastened to the bottom side of the basket via an adapter that is fastened to the bottom side of the skimmer basket. A skimmer socks may optionally be used for easily separating and removing debris from the basket. The weighted handle may be fastened/unfastened from the basket using a novel locking mechanism.

The present disclosure thereby provides a novel and improved form of a skimmer basket with removable weighted handle with a novel locking mechanism that allows users to easily lock and unlock the handle from the skimmer basket for removing accumulated debris. The skimmer basket assembly disclosed herein may allow users to easily handle and clean the skimmer basket compared to conventional apparatuses that perform similar functions. More particularly, the weighted handle may be easily removed from the skimmer basket by means of a novel locking/unlocking mechanism. An extended bar may be used to twist and remove the handle without even directly touching the handle.

The primary components of the apparatus include a skimmer basket, a cylindrically shaped weighted handle, a base cap, and a base adaptor. The body of the skimmer basket have a cylindrical shape or that of a truncated cone (akin to the shape of a conventional bucket). Furthermore, the body of the skimmer basket may include a plurality of holes/openings that allow liquid to pass through it but blocks solid particles. A cylindrically shaped weighted handle forms the primary component of the present invention. The weighted handle may have a top side and a bottom side wherein the top side is fixed with gripping handle. Users may directly hold the gripping handle or use an elongated bar that locks into the gripping handle for locking/unlocking the weighted handle to the skimmer basket.

Further, a base cap may be fixed to the bottom side of the weighted handle. The top side of the base cap is fastened to the bottom side of the weighted handle. The bottom side of the base cap may be have rectangular notch which forms a part of the locking mechanism. A base adaptor having a top side and a bottom side connects the weighted handle to the skimmer basket. The top side of the base adaptor comprises of a T-shaped bar that locks into the rectangular notch provided on the bottom side of the base cap. Furthermore, the bottom side of the base cap is fastened to the base portion of the skimmer basket using one or more fasteners.

The apparatus may be used without skimmer socks. As understood by a person skilled in the art, a skimmer socks makes it easier for users to remove the debris from the basket. Users may replace skimmer socks with fresh skimmer socks at regular intervals. Alternatively, the apparatus may be used without skimmer socks, in this case the skimmer bucket is to be cleaned directly. The skimmer socks is fixed to the skimmer basket by locking the skimmer socks between the base cap of the weighted handle and the base adaptor. If the apparatus is to be used without the socks, a washer may be used instead. The washer maybe disposed between the base cap of the weighted handle and the base adaptor.

The novel locking mechanism used herein is the connection between the T-shaped bar provided on the top side of the base adaptor and the complementing rectangular notch provided on the bottom portion of the base cap that is fixed to the weighted handle. The notch and the T-shaped bar may be placed parallelly for establishing contact between the weighted handle and the base adaptor. Upon establishing contact, the handle may be twisted in a first direction to lock the weighted handle onto the base adaptor. Similarly, for unlocking the weighted handle from the base adaptor, the weighted handle may be rotated/twisted in a second direction (opposite to the first direction). Ideally a ¼ twist may be enough for the purpose of locking and unlocking the weighted handle to the skimmer basket. Stoppers may be provided inside the base cap for restricting the rotating motion of the component beyond a certain range.

Conventional skimmer basket handles comprise small thin plastic straps or a small ridged side clip attached to the sides of the skimmer basket. The small thin plastic straps may not be very strong and some may be easily breakable. The small thin plastic straps and the small side clips rest inside of the skimmer basket below the water line and in the midst of the undesirable debris that has accumulated in the skimmer basket. In order to pick up such handles it is necessary to reach down into the inside of the skimmer basket and touch the undesirable debris in the skimmer basket.

Conventional skimmer basket handles may also comprise small metal or plastic wires that are connected to the rim of the skimmer basket. In the course of time such handles may become detached or lost. This means that the cleaning person will be required to put his or her hand into the unpleasant debris that has accumulated in the skimmer basket.

In addition, many prior art skimmer baskets do not have a weight incorporated into the basket design. Skimmer baskets are usually made of lightweight material such as plastic. A skimmer basket that lacks a weight will float up through the debris in the skimmer well when the pool pump is not operating and not circulating water through the skimmer well. When the skimmer basket floats upwardly with respect to its seated position within the skimmer well, it will break the seal between the walls of the skimmer well and the rim of the skimmer basket. Then when the pool pump is turned on, there is a possibility that debris will lodge in the space between the rim of the skimmer basket and the walls of the skimmer well, thereby preventing the skimmer basket from properly seating itself in the skimmer well basket seat location.

The present invention provides a novel method of a design of the removable skimmer basket handle is curved on top with a bump up peak to be able to hook onto the handle to lift and remove the basket. It has a straight post and in the middle and the opposite end is flat with an internal slot large enough to receive the T bar base cap that will be screwed/attached to the skimmer basket. The separate T bar base cap will allow a person to lock and unlock the handle to the skimmer basket with a ¼ turn twisting motion. The design is ideal for people who wishes to use skimmer sock fabric in their skimmer baskets to collect ultra-fine particles and prevent them going into their pool filter.

The removable handle allows this person the ability to remove the basket using the upper portion curved handle and twist the handle to separate the handle from the basket so the person can remove the fabric sock and replace with a new sock. The person would then reattach the handle to the base pinching the sock between the handle and T bar with a ¼ turn. The T bar base is screwed into place on the inside of the skimmer basket with screws going through the underside of the skimmer basket, through the skimmer basket and into the T bar base screw holes.

Figure 2:
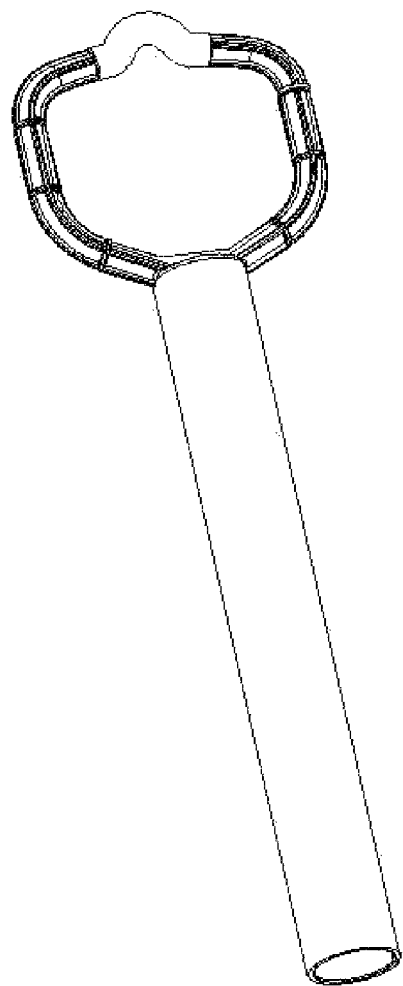
Figure 3:
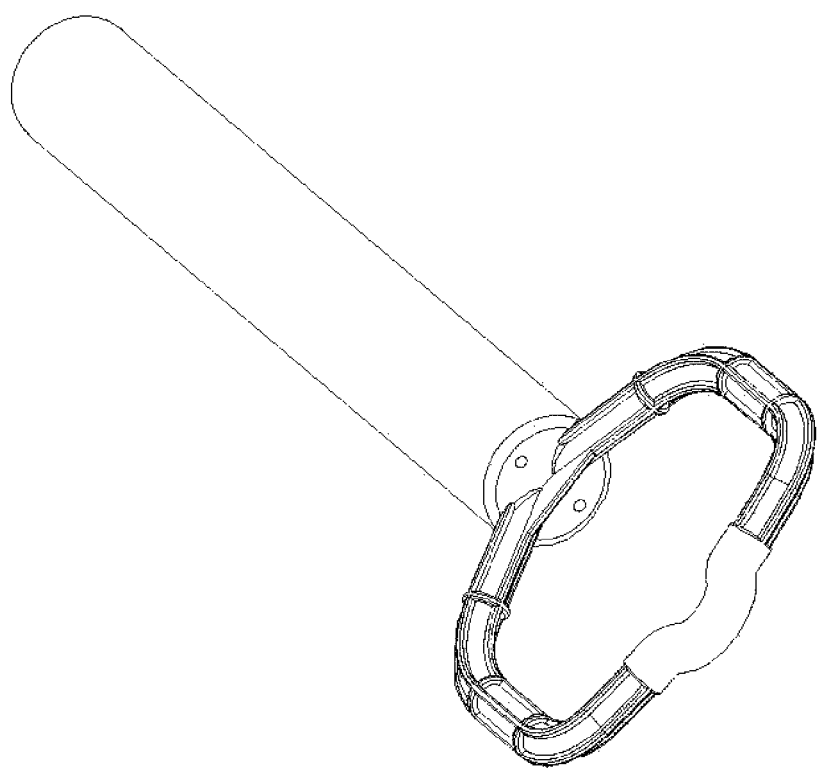
Figure 4:
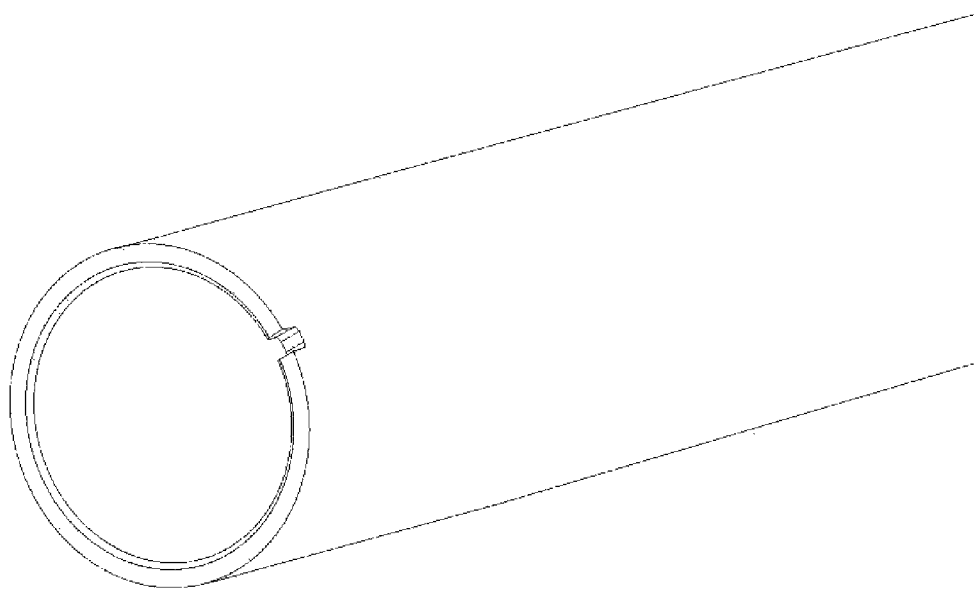
FIG. 4 is a perspective view of the rear end of the weighted handle according to the embodiments of the present disclosure.
Figure 5:
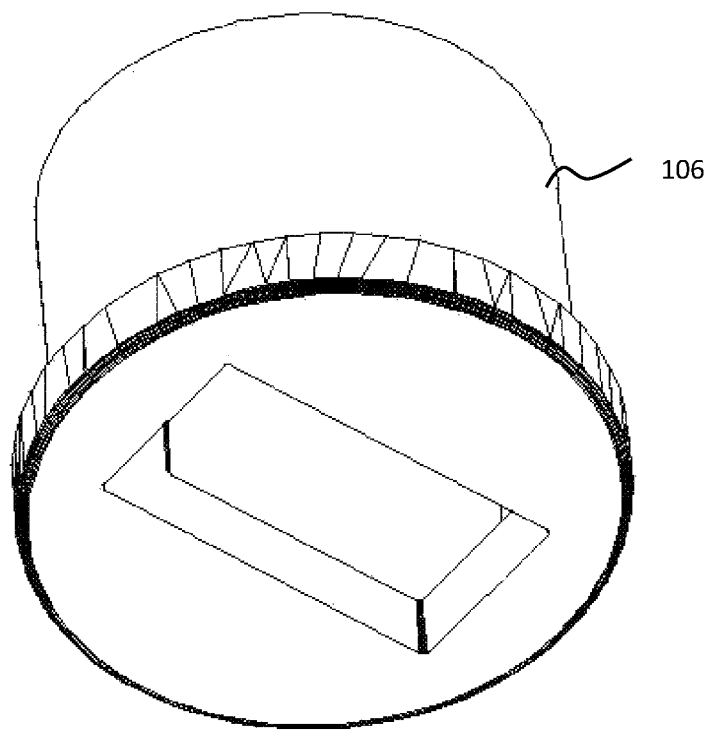
FIGS. 5-6 are perspective views of the base cap of the weighted handle according to the embodiments of the present disclosure.
Figure 6:
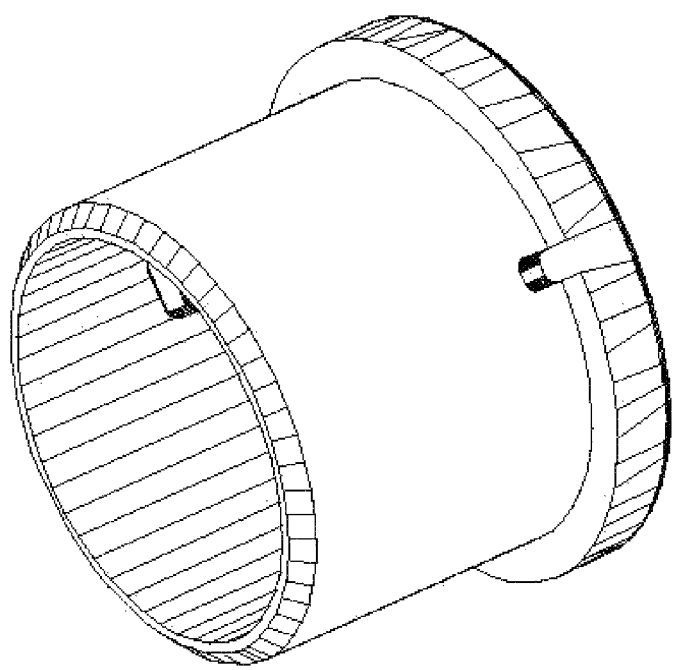
Figure 7:
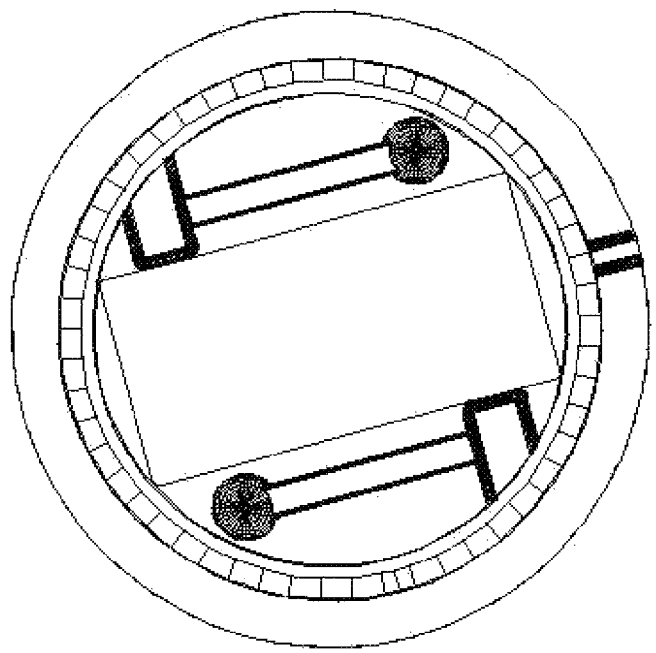
FIG. 7 is a top view of the base cap of the weighted handle according to the embodiments of the present disclosure.
Figure 8:
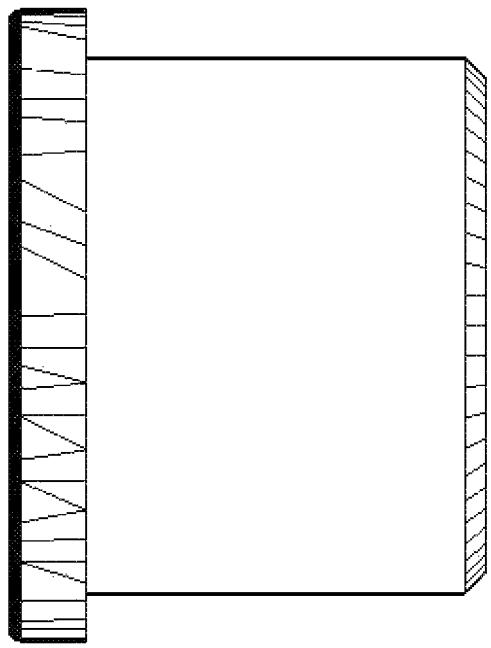
FIG. 8 is a side view of the base cap of the weighted handle according to the embodiments of the present disclosure.
Figure 9:
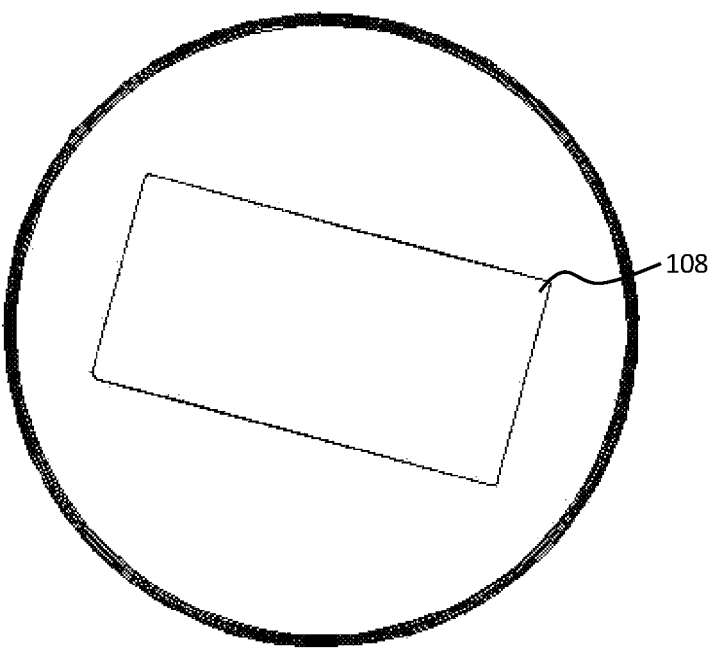
FIG. 9 is a bottom view of the base cap of the weighted handle according to the embodiments of the present disclosure.
Figure 10:
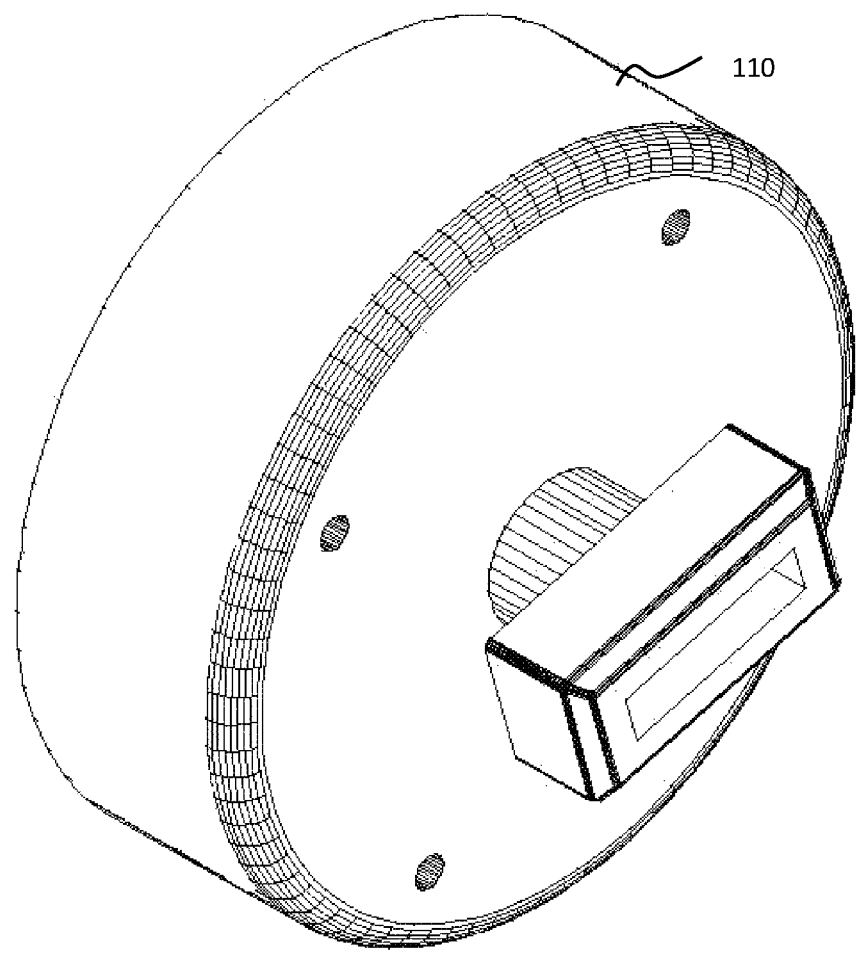
FIG. 10 is a perspective view of the basket connector according to the embodiments of the present disclosure.
Figure 11:
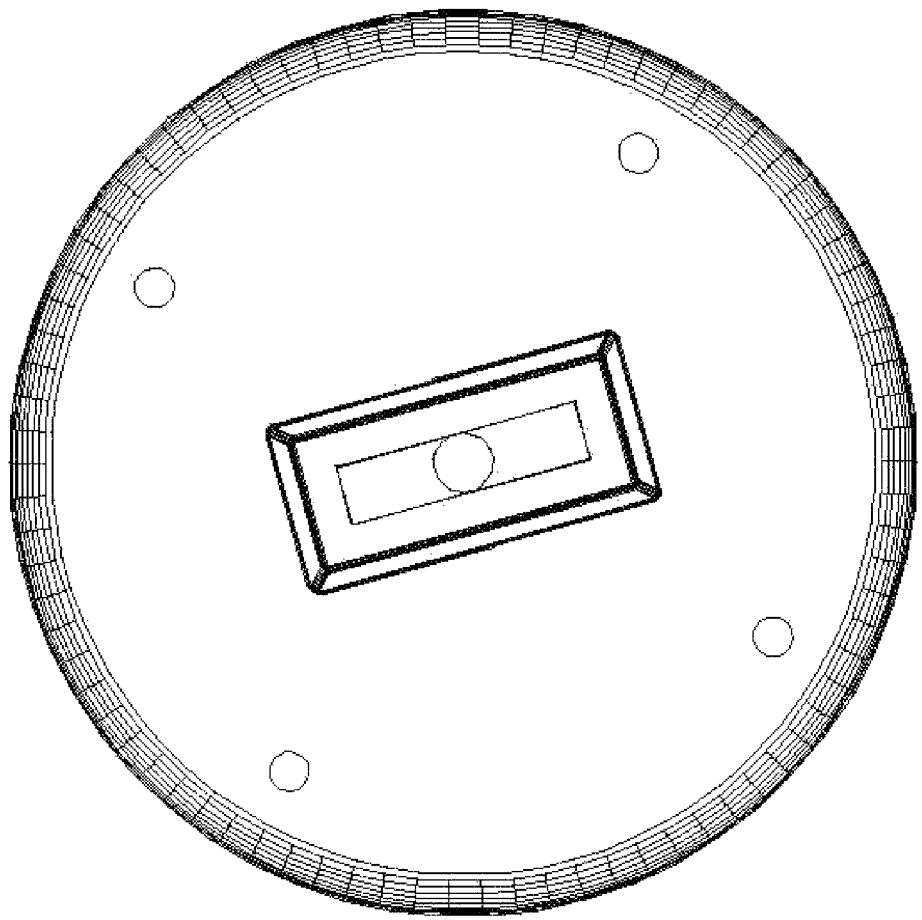
FIG. 11 is a top view of the basket connector according to the embodiments of the present disclosure.
Figure 12:
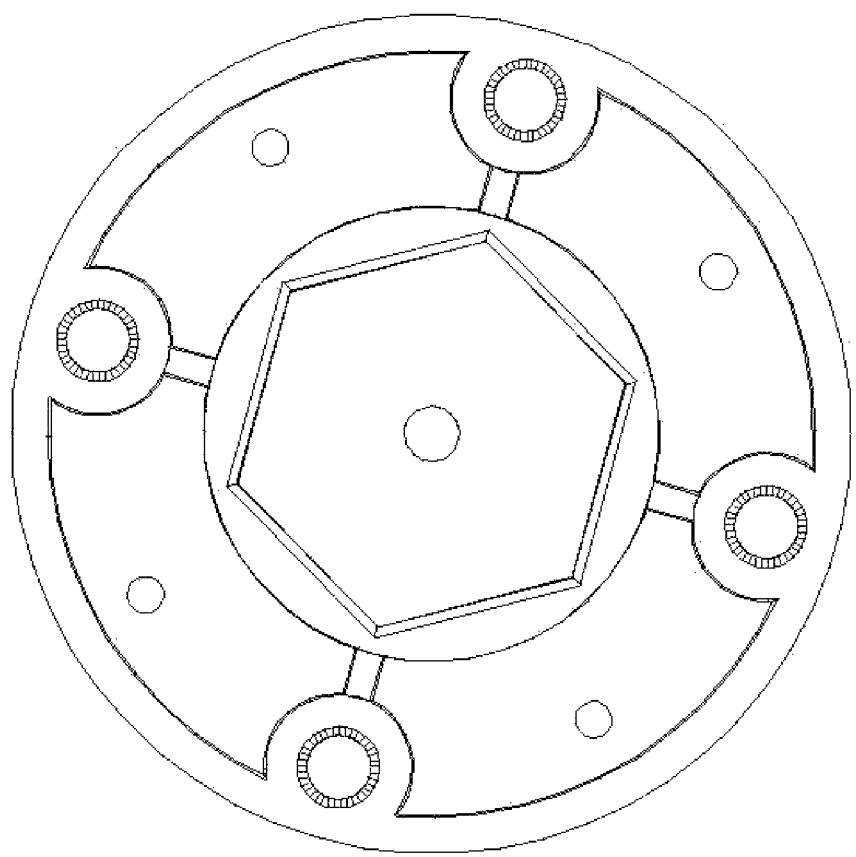
FIG. 12 is a bottom view of the basket connector according to the embodiments of the present disclosure.
Figure 13:
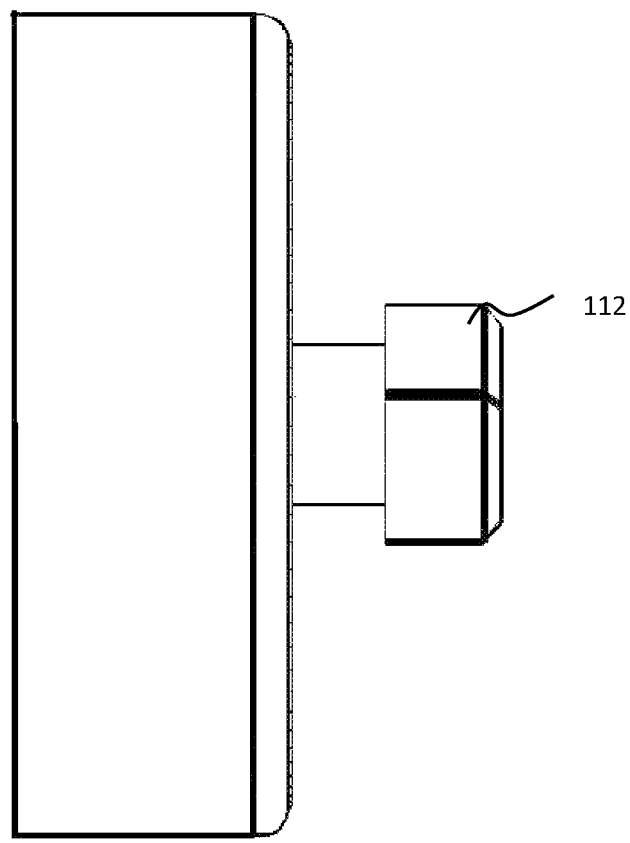
FIG. 13 is a side view of the basket connector according to the embodiments of the present disclosure.
Figure 14:
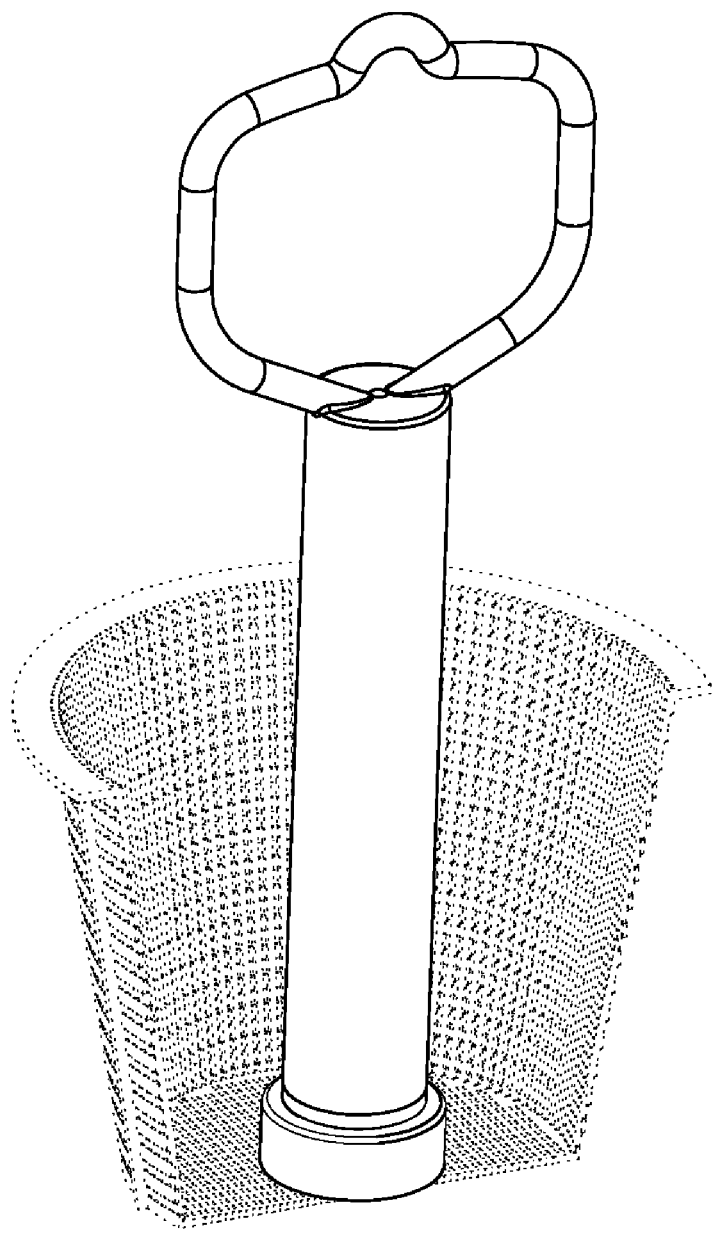
FIG. 14 is an exemplary illustration of the weighted handle connected to a skimmer basket according to the embodiments of the present disclosure.

FIGS. 1-3 are perspective views of the weighted handle disclosed herein disclosure according to the embodiments of the present disclosure. The cylindrically shaped weighted handle 104 forms the primary component of the present invention. The weighted handle 104 may have a top side and a bottom side wherein the top side is fixed with gripping handle 102. FIG. 4 is a perspective view of the rear end of the weighted handle 104 according to the embodiments of the present disclosure. FIGS. 5 and 6 are perspective views of the base cap 106 of the weighted handle 104 according to the embodiments of the present disclosure. FIG. 7 is a top view of the base cap 106 of the weighted handle according to the embodiments of the present disclosure. FIG. 8 is a side view of the base cap 106 of the weighted handle 104 according to the embodiments of the present disclosure. FIG. 9 is a bottom view of the base cap showing the rectangle shaped notch 108 on its rear end according to the embodiments of the present disclosure. FIG. 10 is a perspective view of the basket connector 110 according to the embodiments of the present disclosure. FIG. 11 is a top view of the basket connector according to the embodiments of the present disclosure. FIG. 12 is a bottom view of the basket connector according to the embodiments of the present disclosure. FIG. 13 is a side view of the basket connector showing the T-shaped bar that locks into the rectangular notch 108 provided on the bottom side of the base cap according to the embodiments of the present disclosure. FIG. 14 is an exemplary illustration of the weighted handle connected to a skimmer basket according to the embodiments of the present disclosure.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications, and changes may be made without departing from the spirit of the present solution. All the features disclosed in this specification (including any accompanying claims, abstract, and drawings), and all of the steps of any method or process so disclosed, may be combined in any combination, except combinations where at least some of such features or steps are mutually exclusive.

The terms "include," "have," and variations thereof, as used herein, have the same meaning as the term "comprise" or an appropriate variation thereof. Furthermore, the term "based on", as used herein, means "based at least in part on." Thus, a feature that is described as based on some stimulus can be based on the stimulus or a combination of stimuli including the stimulus.

What is claimed is:

1. An apparatus comprising:
    a skimmer basket, wherein the body of the skimmer basket comprises a plurality of openings;
    a cylindrically shaped weighted handle having a top side and a bottom side wherein the top side is fixed with a handle;
    a base cap fixed to the bottom side of the weighted handle, wherein the bottom side of the base cap has a rectangular notch; and
    a base adaptor having a top side and a bottom side, wherein the top side of the base adaptor comprises of a T-shaped bar that locks into the rectangular notch provided on the bottom side of the base cap, and wherein the bottom side of the base cap is fastened to the base portion of the skimmer basket using one or more fasteners.

2. The apparatus of claim 1, further comprising:
    a skimmer socks fixed inside the skimmer basket, wherein the skimmer socks is fixed to the skimmer basket by locking the skimmer socks between the base cap of the weighted handle and the base adaptor.

3. The apparatus of claim 1, further comprising:
    a washer disposed between the base cap of the weighted handle and the base adaptor.

4. The apparatus of claim 1, wherein weighted handle having the base cap fixed to its bottom side is locked to the base adaptor via a rotating movement in a first direction.

5. The apparatus of claim 4, wherein the weighted handle having the base cap to its bottom side is unlocked from the base adaptor via a rotating movement in a second direction.

* * * * *